US012210877B2

(12) United States Patent
Dubeyko et al.

(10) Patent No.: US 12,210,877 B2
(45) Date of Patent: Jan. 28, 2025

(54) OFFLOADING COMPUTATION BASED ON EXTENDED INSTRUCTION SET ARCHITECTURE

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/118,367

(22) Filed: Mar. 7, 2023

(65) Prior Publication Data

US 2023/0205532 A1 Jun. 29, 2023

(51) Int. Cl.
*G06F 9/30* (2018.01)
(52) U.S. Cl.
CPC ...... *G06F 9/30189* (2013.01); *G06F 9/30145* (2013.01)

(58) Field of Classification Search
CPC .......................... G06F 9/30189; G06F 9/30145
See application file for complete search history.

(56) References Cited

U.S. PATENT DOCUMENTS 9,405,561 B2 * 8/2016 Giroux ................ G06F 9/44547
2022/0206855 A1 * 6/2022 Challapalle ......... G06F 9/30076

* cited by examiner

*Primary Examiner* — Zachary K Huson
(74) *Attorney, Agent, or Firm* — BakerHostetler

(57) ABSTRACT

The present disclosure describes techniques for offloading computation based on an extended instruction set architecture (ISA). The extended ISA may be created based on identifying functions executed multiple times by a central processing unit (CPU). The extended ISA may comprise hashes corresponding to the functions and identifiers of extended operations associated with the functions. The extended operations may be converted from original operations of the functions. The extended operations may be executable by a storage device. The storage device may be associated with at least one computational core. Code may be synthesized based at least in part on the extended ISA. Computation of the synthesized code may be offloaded into the storage device.

19 Claims, 20 Drawing Sheets

1500

```
┌─────────────────────────────────────────────────────────────────────┐
│ Create an extended instruction set architecture (ISA) based on      │
│ identifying functions executed multiple times by a central          │
│ processing unit (CPU), wherein the extended ISA comprises hashes    │
│ corresponding to the functions and identifiers of extended          │
│ operations associated with the functions, wherein the extended      │
│ operations are converted from original operations of the functions, │
│ wherein the extended operations are executable by a storage device, │
│ and wherein the storage device is associated with at least one      │
│ computational core 1502                                             │
└─────────────────────────────────────────────────────────────────────┘
```

Synthesize code based at least in part on the extended ISA 1504

Offload computation of the synthesized code into the storage device 1506

FIG. 15

OFFLOADING COMPUTATION BASED ON EXTENDED INSTRUCTION SET ARCHITECTURE

BACKGROUND

Companies and/or individuals are increasingly utilizing and/or producing a large quantity of data. Such data may need to be collected, stored, and translated into usable information (e.g., processed). Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 15 shows an example process computational offload using an extended instructions set in accordance with the present disclosure.

DETAILED DESCRIPTION OF ILLUSTRATIVE EMBODIMENTS

The Central Processing Unit (CPU)-based model of calculation may be one of the obstacles to enhancing performance of data processing (e.g., calculations). The CPU-based model of calculation requires moving data and/or code from persistent memory into dynamic random-access memory (DRAM), and from DRAM into one or more CPU cache(s). Calculation may be executed by means of sharing one or more CPU core(s) amongst multiple threads of execution. However, this computation paradigm introduces a significant number of drawbacks that prevent improved computation performance. For example, this computation paradigm may cause problems with cache coherence, memory wall, and data movement.

To address the drawbacks introduced by the CPU-based model of calculation, computation may be offloaded into data storage space. If computation is offloaded into the data storage space, computational storage or memory may process data in the storage space, thereby bypassing CPU cores.

Figure 1:
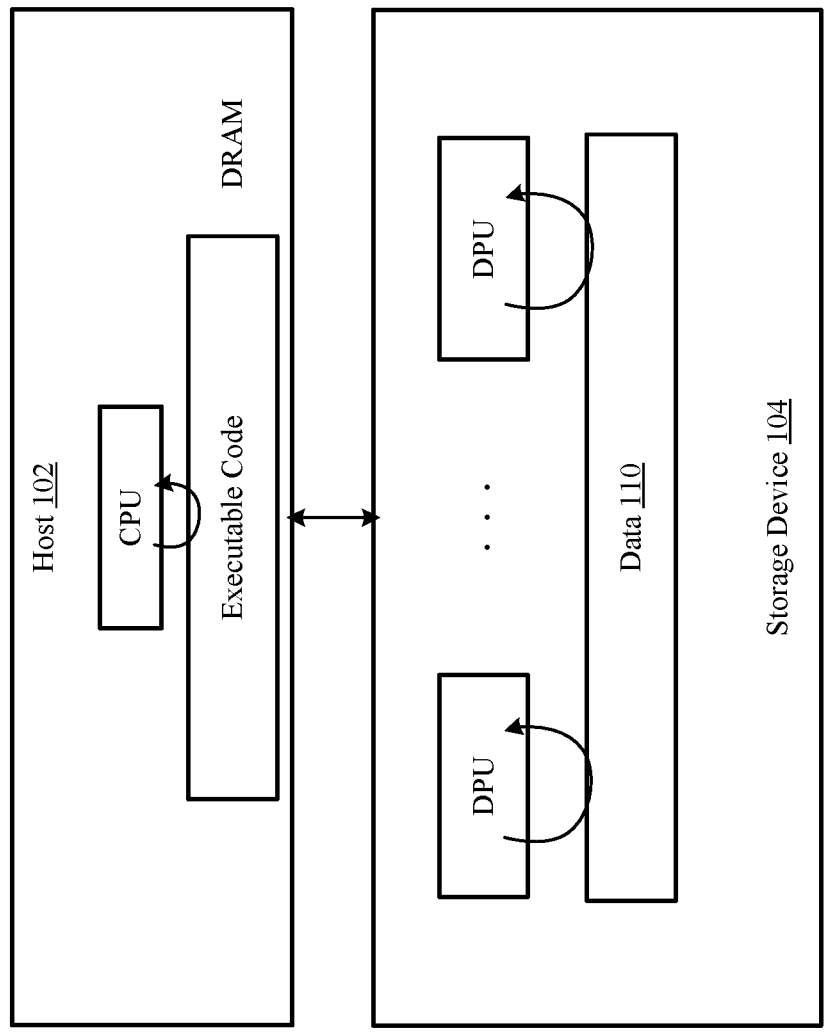
FIG. 1 shows an example framework for computation in accordance with the present disclosure.

FIG. 1 is an example framework 100 for offloading data processing in accordance with the present disclosure. The framework 100 may comprise a host 102 and a storage device 104. The host 102 may comprise one or more CPUs (e.g., CPU cores). The CPU(s) may be configured to execute an application (e.g., applying algorithms or executable code to data). The host 102 may comprise a DRAM. The DRAM may be configured to keep the application and data during execution. The storage device 104 may comprise a plurality of data processing units (DPUs). The data 110 may be processed in the storage device 104, such as by the DPUs.

The CPU(s) and the plurality of DPUs may represent different platforms (for example, x86 and ARM, respectively). Thus, the DPUs may be unable to execute code that is built for the CPU's platform. It may be possible to compile code for the DPU platform and/or to use a just-in-time (JIT) compiler approach. It may also be possible to implement the logic of data processing by means of field-programmable gate array (FPGA) based cores. The CPU(s) may need to start, manage, and/or orchestrate the activity of the DPUs in the storage device 104.

Figure 2:
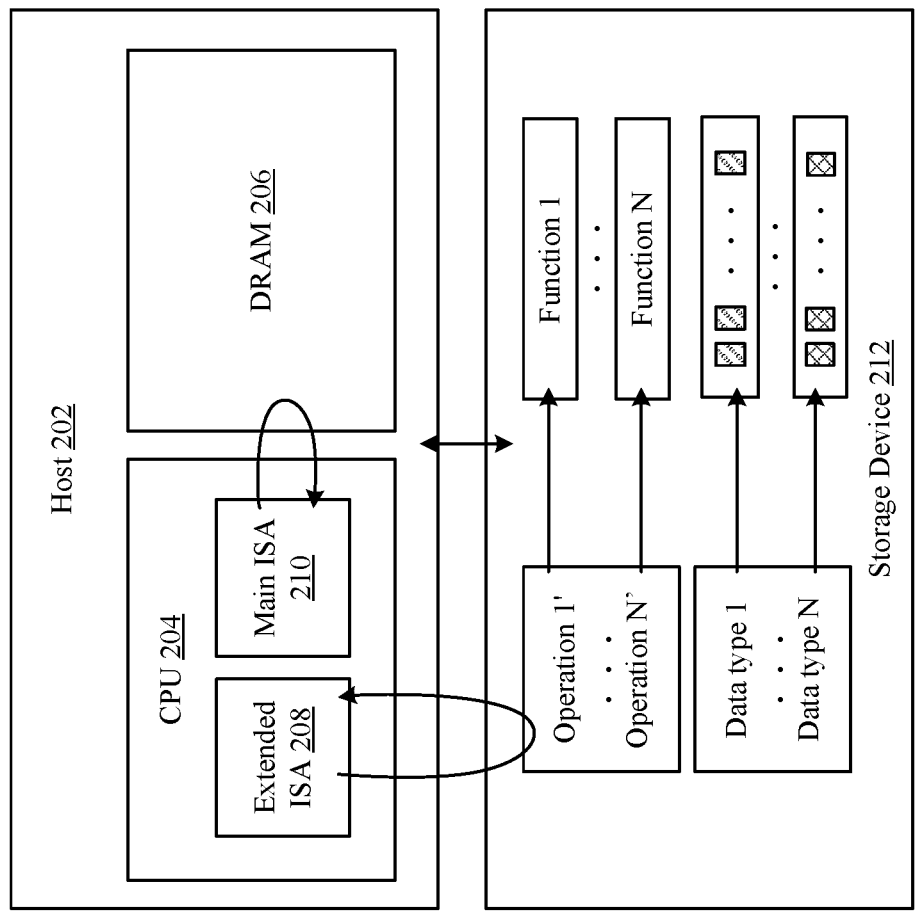
FIG. 2 shows an example extended instructions set architecture in accordance with the present disclosure.

Computation may be offloaded to the storage device using an extended instructions set. FIG. 2 shows an example system 200 comprising an extended instructions set architecture (i.e., extended ISA). The example system 200 may comprise a host 202 and a storage device 212.

The host 202 may comprise one or more CPUs (e.g., CPU cores) 204. The CPU(s) 204 may be configured to execute an application (e.g., applying algorithms or executable code to data). Each of the CPU(s) 204 may be a computation engine that comprises an arithmetic logic unit (ALU), a management unit, an instructions cache, and/or a data cache. The host 202 may comprise a DRAM 206. The DRAM 206 may be configured to keep the application and data during execution. The instruction cache and/or data cache may be static random-access memory (SRAM) memory that is configured to temporarily store instructions (instruction cache) and data (data cache) near the ALU of the CPU(s) 204. The instructions may be taken one by one from the instruction cache. Every instruction may be executed. The management unit of the CPU(s) 204 may execute the instruction(s) by selecting a functional ALU block that performs data transformation by its circuitry. Not every instruction causes data modifications in the data cache. For example, there may be a jump (jmp) machine instruction that is configured to instruct which instruction will be executed next. Any result may be initially stored in the register of the CPU. The register may be modified by multiple machine instructions until the result is stored into the data cache.

The CPU(s) 204 may comprise a main instruction set architecture (ISA) 210. The main ISA 210 may comprise a set of identification numbers. The set of identification numbers may be utilized to select a particular functional block of the ALU to apply some modification to the data. In embodiments, computation may happen only inside of the CPU(s) 204. Code and/or data may need to be copied from persistent memory in the storage device 212 into the DRAM 206. The result of the computation may need to be stored in DRAM 206 and flushed into the persistent memory of the storage device 212. In other embodiments, an extended ISA 208 may be created based on identifying functions executed multiple times by the CPU 204. The extended instructions in the extended ISA 208 may be executed by any computational core outside of the CPU(s) 204. The CPU(s) 204 may delegate the computation to one or more external computation cores if an execution flow includes one or more instructions from the extended ISA 208. Data types, operations, and functions, which are depicted in FIG. 2, are discussed below in more detail with regard to FIGS. 3-14.

Figure 3:
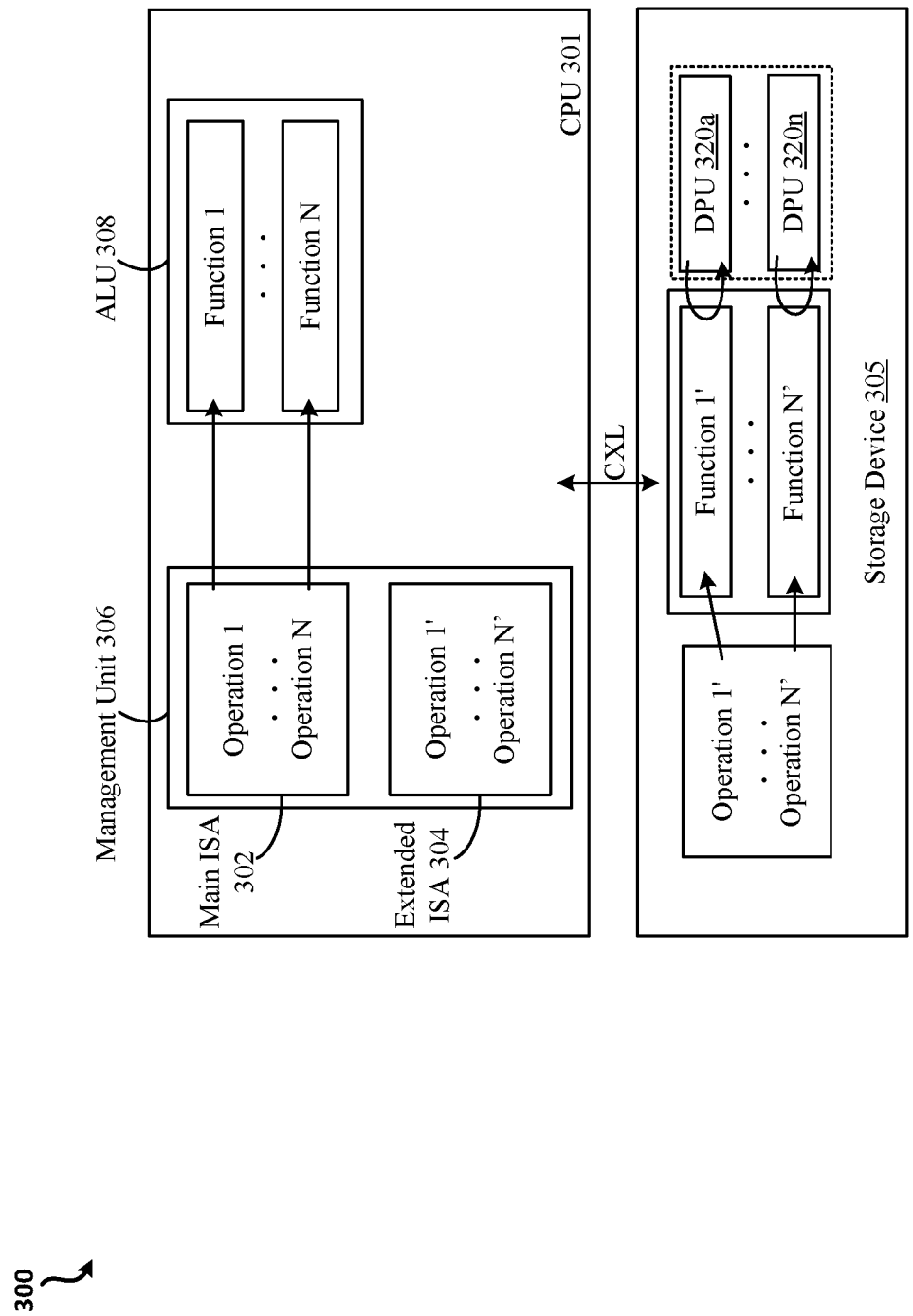
FIG. 3 shows an example framework for extended instructions execution in accordance with the present disclosure.

FIG. 3 shows an example framework 300 for execution of extended instructions. The framework 300 comprises a CPU 301 and a storage device 305. The CPU 301 may be a computation engine that comprises an arithmetic logic unit (ALU 308) and a management unit 306. In some examples, the CPU 301 and the storage device 305 may be in communication via Compute Express Link (CXL). CXL may provide a way for the CPU 301 to access the storage device 305 as a memory. Thus, the CPU 301 may be able to access the storage device 305 internals as a memory like accessing local DRAM on host side. The storage device 305 may be an external computation entity. The CPU 301 may comprise a main instruction set architecture (i.e., Main ISA) 302. The CPU 301 may create an extended instruction set architecture (i.e., Extended ISA) 304 based on identifying functions executed multiple times.

The CPU 301 may access a persistent memory in the storage device 305 as a byte-addressable space. Functions may be stored in the persistent memory on the storage device 305 side. The persistent memory may be the initial storage place for executable code. The storage device 305 may be configured to associate some methods or functions in the persistent memory with an instructions set. For example, the storage device 305 may be configured to associate operations (e.g., Operation 1' . . . . Operation N') registered in the extended ISA 304 with functions (e.g., Function 1' . . . . Function N'). The storage device 305 may execute the functions using a plurality of data processing units (DPUs) 320*a-n*.

An application may be represented as a binary stream of machine instructions. The instructions may include instructions from a main ISA 302 and/or from the extended ISA. Computation associated with the instructions from the main ISA 302 may be executed by an internal ALU 308. Computation associated with the extended instructions from the extended ISA 304 may be offloaded to the storage device 305. The plurality of DPUs 320*a-n* of the storage device 305 may execute the computation associated with the extended ISA. The management unit 306 of the CPU 301 may send the extended instruction(s) to the storage device 305. The CPU 301 may send the extended instruction(s) to the storage device 305 using CXL.

Figure 4:
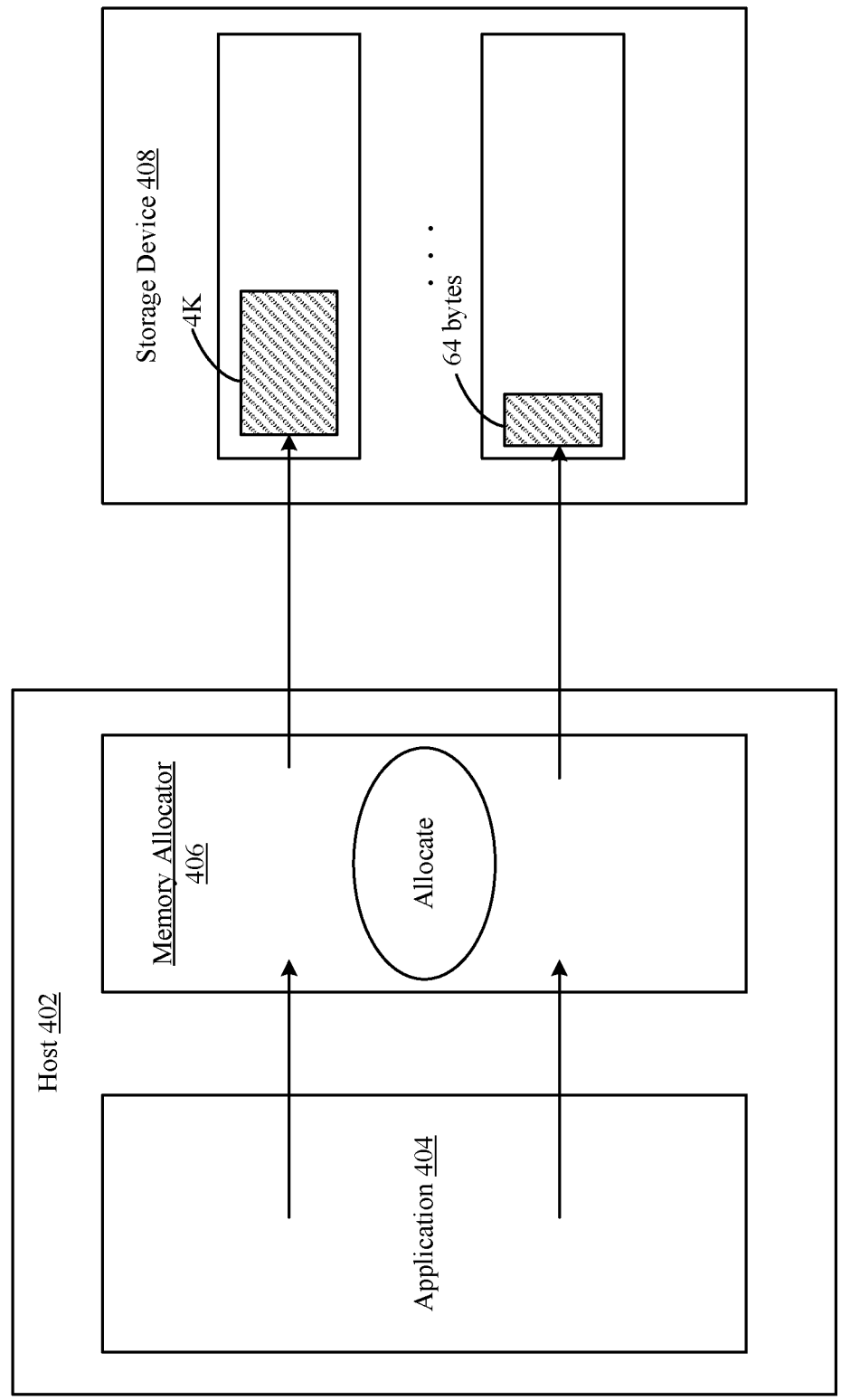
FIG. 4 shows an example framework for memory allocation in a storage device in accordance with the present disclosure.

FIG. 4 shows an example framework 400 for memory allocation in a storage device. An instruction set may be represented by the features of a high-level programming language and/or by a library functionality. An application may need to be developed by a programmer in order to be able to access new instructions or extended instructions. Any ISA extension may therefore require the application code to be rewritten or re-built. However, rewriting or re-building the application is inflexible and time consuming. Thus, techniques for automatic application refactoring so that the CPU and the storage device can collaborate with each other to extend the CPU's ISA are desirable.

Every machine instruction may expect a particular granularity of data under processing. Thus, any extended instruction may be applied for an object (e.g., a piece of data) of a particular size in bytes. A storage device 408 may group or aggregate data of the same size into dedicated buckets. An application 404 may use a memory allocator 406 for allocating memory while keeping the internal data structures. Allocated memory may contain objects. In examples, the memory allocator 406 may allocate the memory in persistent memory of the storage device 408.

In embodiments, the storage device 408 may support a stream concept. Each stream may store objects of a particular size. For example, one stream may store a plurality of 64-byte objects. Another stream may store a plurality of 4K objects. A plurality of streams may be created in the storage device 408. The storage device 408 may have knowledge regarding the granularity of all available objects in the application 404 and/or the operating system. A stream may be imagined like an array of objects, and a particular extended operation may be applied to all (or a portion) of the objects in the stream.

Figure 5:
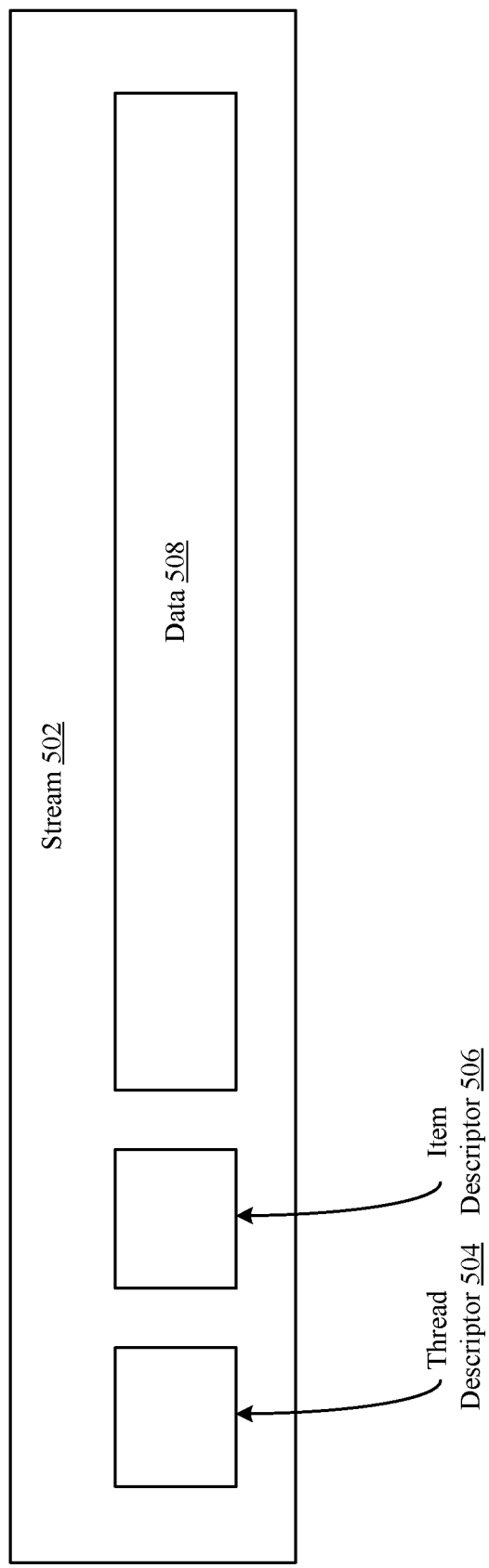
FIG. 5 shows an example stream in accordance with the present disclosure

FIG. 5 shows an example stream. Each steam, e.g., the stream 502, may comprise a thread descriptor 504, an item descriptor 506, and data 508. The data 508 may comprise a sequence of objects of the same data type. The sequence of objects may comprise multiple objects of the same type. The thread descriptor 504 may describe one or more algorithms. For example, the thread descriptor 504 may be indicative of algorithm logic to be applied to the data 508 (e.g., the sequence of objects) associated with the stream 502. An application may use this logic to offload data processing into the storage device side. The item descriptor 506 may comprise metadata that defines the size or granularity of one object instance. The item descriptor 506 may comprise metadata describing the type, granularity, and sequence of object's fields. The item descriptor 506 may describe the stream at whole (e.g., a number of items in the stream, an available capacity of the stream, etc.).

Figure 6:
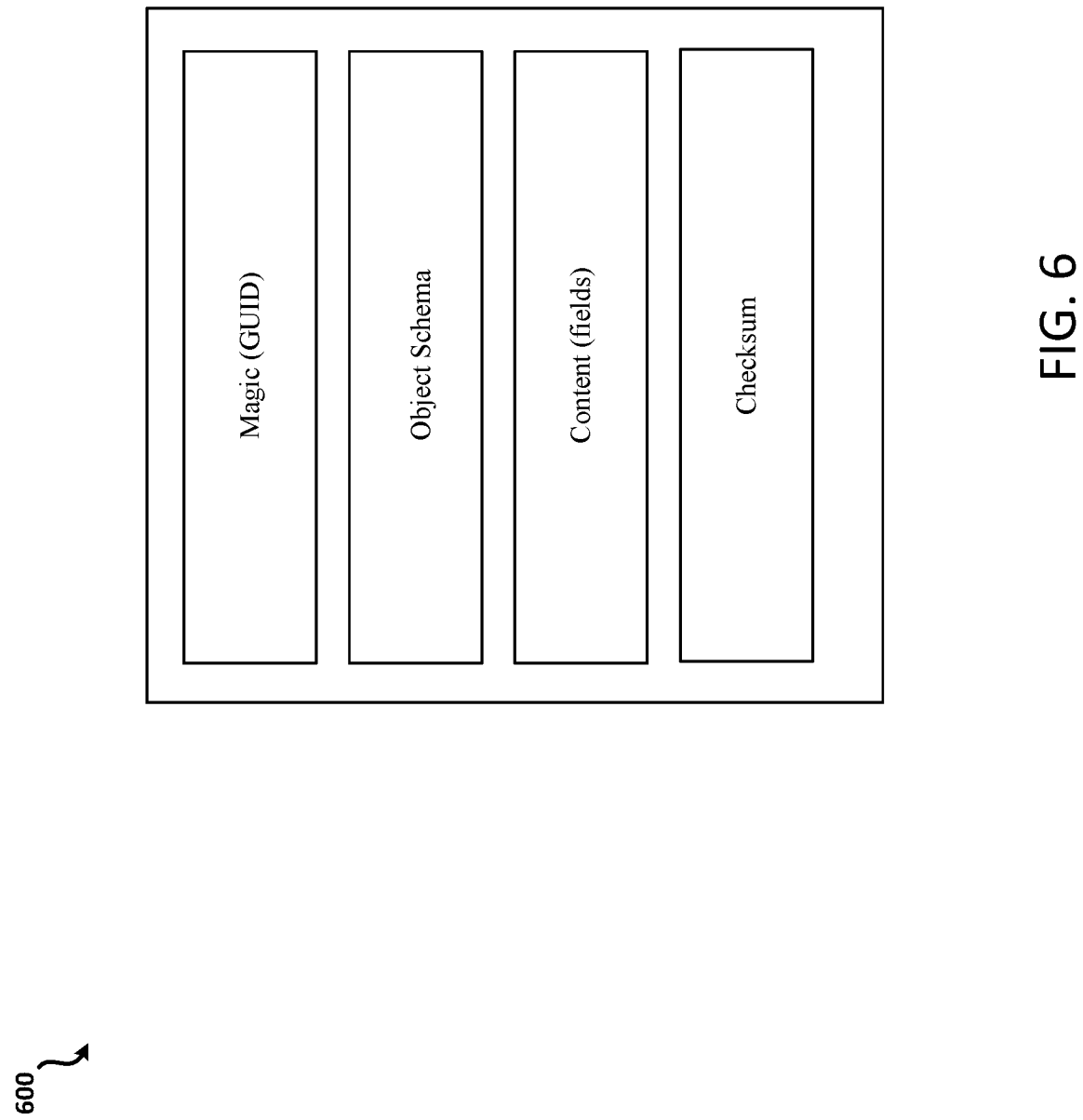
FIG. 6 shows an example object-based memory allocation scheme in accordance with the present disclosure.

An object may be represented not just as simple piece of memory. The object may have a structure. FIG. 6 shows an example object-based structure 600. The structure may comprise a magic or globally unique identifier (GUID) for identifying data type. The magic may identify the data type. A storage device may use the magic field to gather objects of the same type into a specialized group of objects. The structure may comprise an object schema or metadata describing the object structure. The object schema may comprise metadata that describe items or fields of the object. This metadata may be used by a storage device during operations. In embodiments, an application may create and store the object's metadata. In other embodiments, a storage device may create such metadata itself. For example, the storage device may distinguish similar data patterns and create metadata based on the similarity of the data objects. Thus, the storage device may use the object metadata for deeper classification and to gather objects into specialized groups. Additionally, the structure may comprise the content of object (e.g., fields of object) and a checksum. The checksum may be configured to check the object validity.

Figure 7:
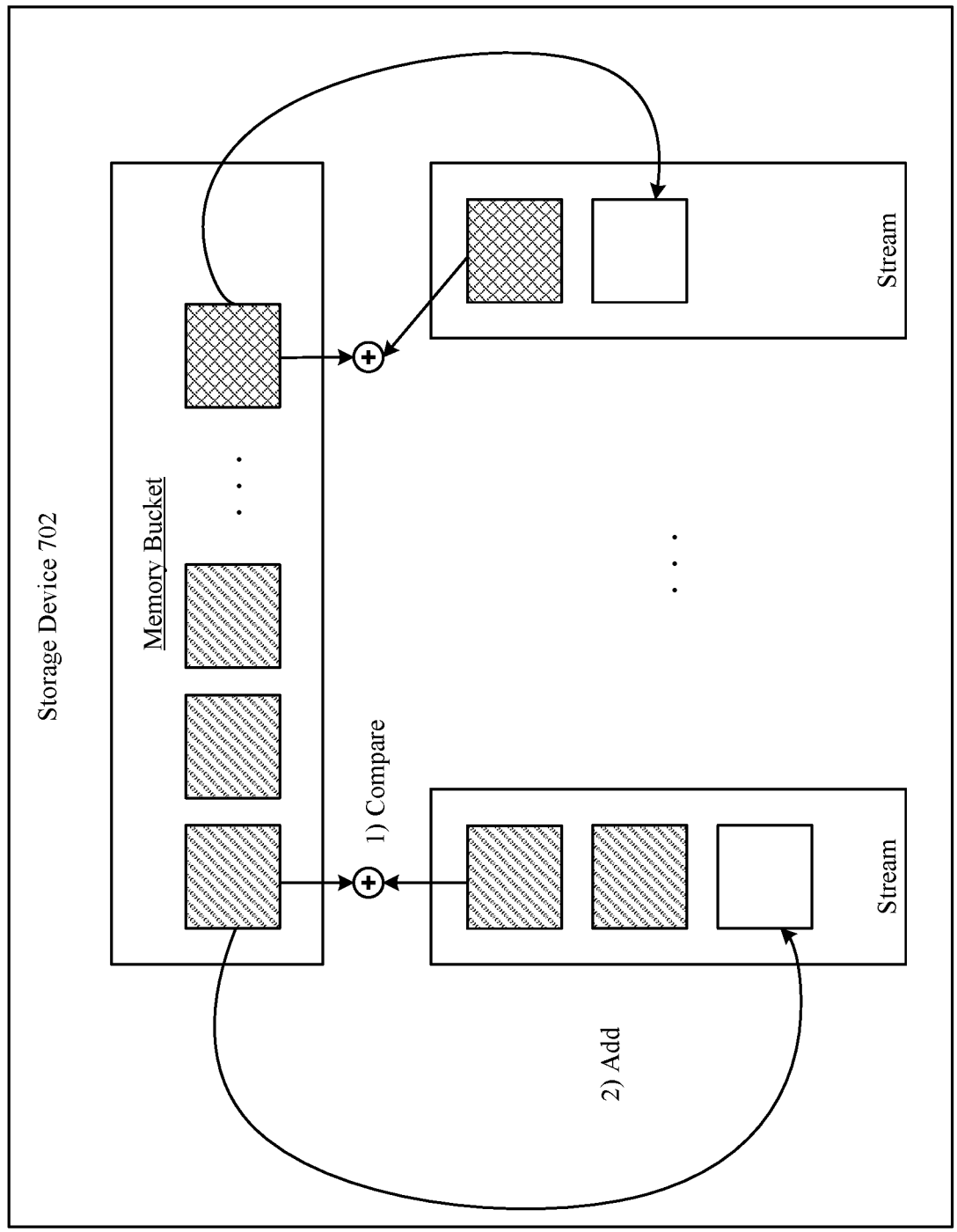
FIG. 7 shows example framework for data type detection in accordance with the present disclosure.

FIG. 7 shows example framework 700 for data type detection. A memory allocator may allocate pieces of memory for an application in a storage device 702. The application may store objects into the allocated memory (e.g., into a memory bucket). At numeral 1, the storage device 702 may detects data types of the objects in the memory bucket. The storage device 702 may analyze metadata or recognize the structure of each of the objects in a particular memory bucket. The storage device 702 may compare objects in the memory bucket and create streams to store objects of a particular data type into a dedicated object stream. At numeral 2, the storage device may add objects to streams based on the data types of the objects. The object streams may represent object arrays that may be used to apply operations for a particular data type.

Figure 8:
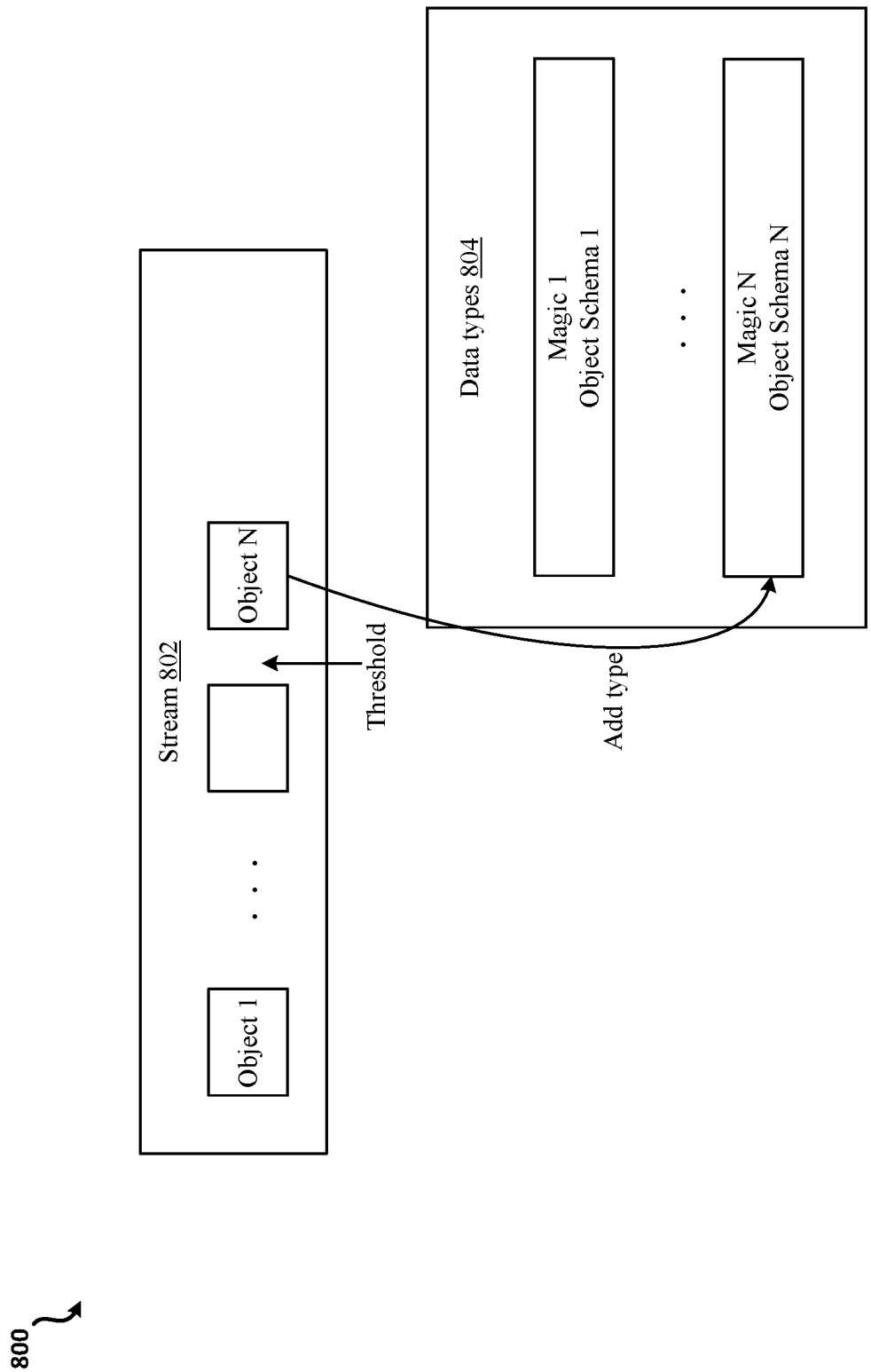
FIG. 8 shows an example framework for data type registration in accordance with the present disclosure.

FIG. 8 shows an example framework 800 for data type registration. If an object stream contains only one object, then it may not yet be associated with a data type. A data type may be registered into a data type table 804 if an object stream 802 contains some number of objects that satisfies (e.g., exceeds) a threshold. For example, the threshold may be ten objects. If the object stream 802 comprises enough objects (e.g., a number of objects exceeding the threshold), the data type may be registered in the data type table 804. The magic or GUID for identifying the data type and the object schema or metadata describing the object structure may be stored in the data type table 804. The application may define the threshold associated with data type registration. Computation offload may make sense for some particular number of items in object stream. This number may depend on object granularity and algorithm complexity. Thus, the threshold may be different depending on object granularity and algorithm complexity.

Figure 9:
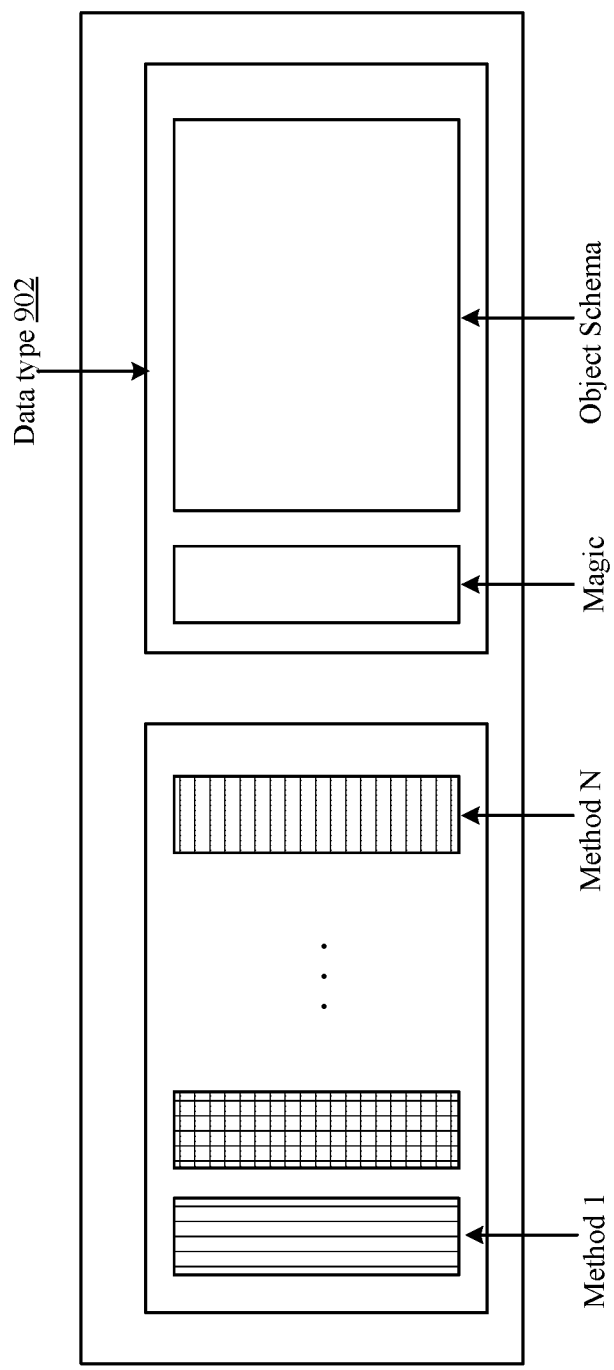
FIG. 9 shows an example registered data type in accordance with the present disclosure.

FIG. 9 shows an example registered data type 900. A data type may indicate a structural definition or a C++ class. A C++ class may be associated with a plurality of methods. The plurality of methods may manipulate the class instance (e.g., object). Thus, a registered data type may be associated with methods or functions that are configured to execute data processing on the storage device side. An application may register or store methods or functions (e.g., Method 1-Method N) for a particular data type 902 in the storage device space. The application may offload computation by simply requesting to apply some function execution associated with an object stream on the storage device side. Thus, the object stream may be treated as an array and the method or function may execute the computation by applying logic to every object in the array.

Figure 10:
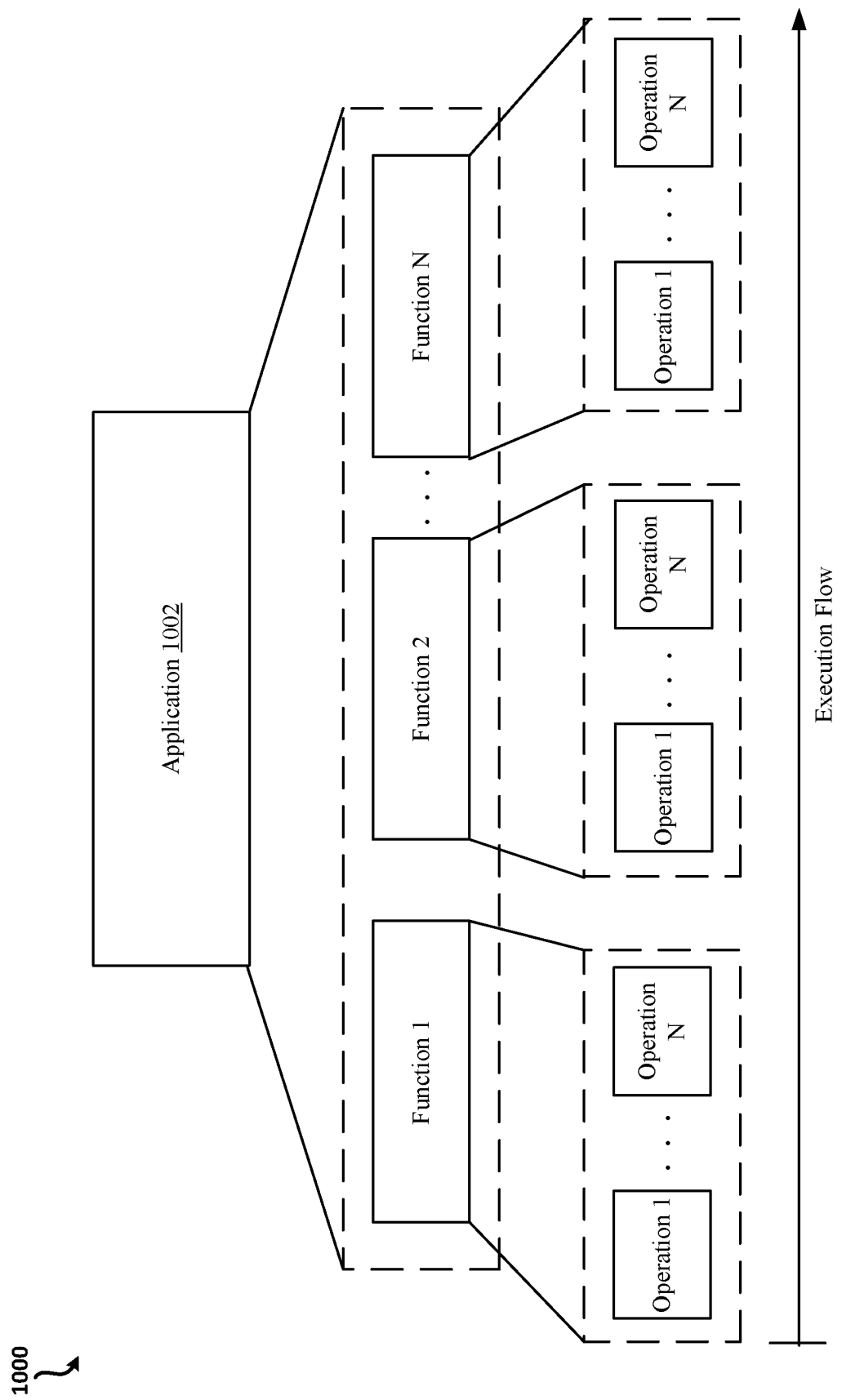
FIG. 10 shows an example application execution flow in accordance with the present disclosure.

FIG. 10 shows an example application execution flow 1000. An application 1002 may comprise an aggregation of functions (e.g., Function 1-Function N). The functions may build the execution flow of the application. Every function may comprise a sequence of machine instructions or operations (e.g., Operation 1-Operation N). The machine instructions may be executed by a CPU with the goal to apply an algorithm to data. A compiler may receive source code associated with the application and transform the source code into the machine instructions that can be executed by the CPU. Initially, an application may contain only machine instructions from the main ISA of the CPU. However, the CPU may be configured to transform executed functions (e.g., functions already executed by the CPU) into an extended ISA. Computation associated with the extended ISA may be offloaded into the storage device.

Figure 11:
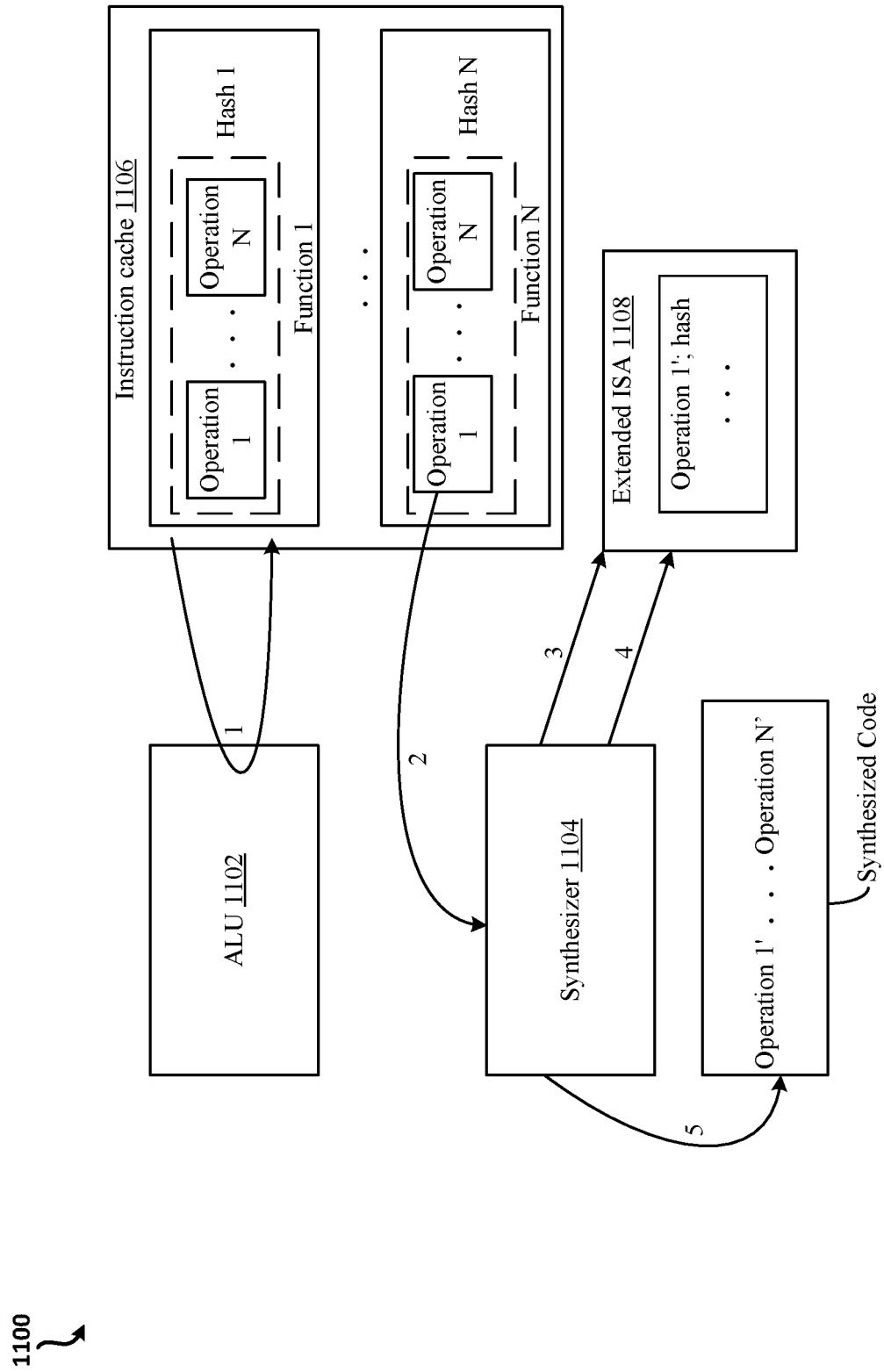
FIG. 11 shows an example framework for extending an instructions set in accordance with the present disclosure.

FIG. 11 shows an example framework 1100 for extending an instructions set. At numeral 1, an ALU 1102 of a CPU may be configured to execute a function based on instructions stored in an instructions cache 1106. At numeral 2, the CPU may be configured to calculate a hash for every function executed by the ALU 1102. At numeral 3, it may be determined if the hash exists in an extended ISA 1108. If the hash does not exist in the extended ISA 1108, at numeral 4, identifiers of extended operations associated with the function and the hash of the function may be added to the extended ISA 1108. The hash and operation identification may be stored temporarily in an extended ISA 1108. If the same function is executed multiple times by the CPU, then the hash and operation identification may continue to stay in the extended ISA 1108. When a function is executed, the hash and operation identification may be stored into the extended ISA table as an extended identifier. The function binary executable code (or FPGA implementation) may be stored on the storage device side. The function itself may be removed from the instruction cache after the first execution. Next time when the function is to be executed, the function may be recompiled and stored as an extended function/operations on the storage device side. In some examples, if the CPU receives the function with machine instructions based on the main ISA, then the function may be offloaded onto the storage device side using the extended operations. In other examples, if the CPU receives extended operation(s), then the extended operation(s) may be offloaded and executed by the storage device.

If the same function is not executed multiple times by the CPU, the hash and operation ID may be removed from the extended ISA 1108. Thus, frequently executed functions may be converted by the CPU into extended operations or instructions. The extended ISA 1108 may be a mapping table that maps the extended operation ID with the hash of the function. A function itself may be represented by a piece of binary code that could be significant in size. Only the hash and the extended operation ID may be added into the extended ISA table 1108. At numeral 5, the extended operation(s) may be used to synthesize code. Synthesizing code may comprise changing the initial executable binary image that is constructed from the machine instructions based on the main ISA to a sequence of machine instructions based on the extended ISA. Every machine instruction associated with the extended ISA may indicate a whole function that may include a sequence of multiple instructions associated with the main ISA. The synthesized code may be executed on the storage device side. To execute the synthesized code on the storage device side, the function may be added into a special memory area on the storage device side. The function may be identified by means of a synthesized identification number.

Figure 12:
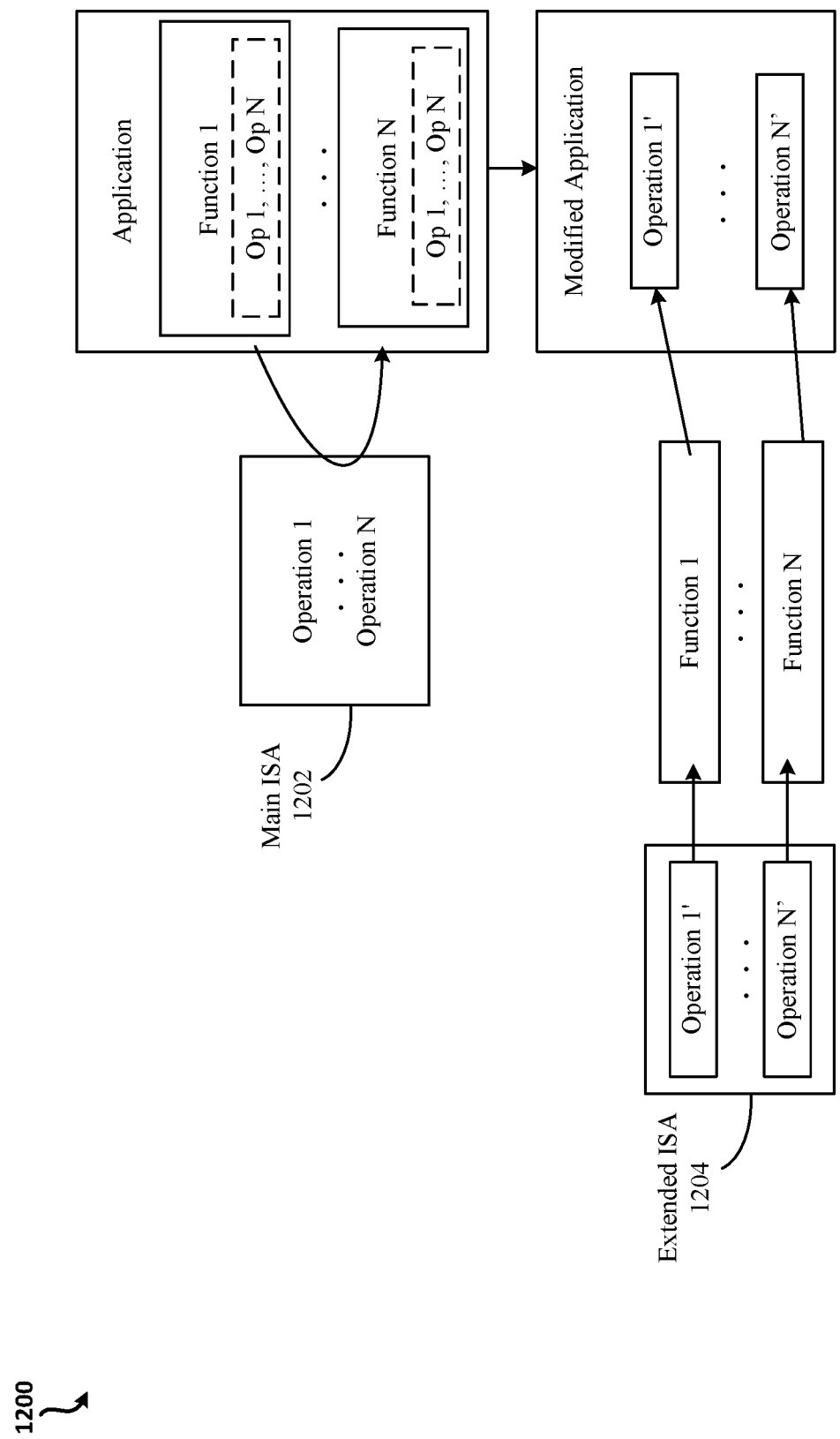
FIG. 12 shows an example framework for CPU-based application refactoring in accordance with the present disclosure.

FIG. 12 shows an example framework 1200 for CPU-based application refactoring. A CPU may be configured to re-compile an application to create a modified application. The CPU may re-compile the application to create the modified application by exchanging a function's code in the initial application code with extended machine instruction(s). The extended machine instruction(s) may be executed on the storage device side. A synthesizer subsystem may identify available extended operations. The synthesizer subsystem may create new code using the extended ISA. Thus, base machine instructions (e.g., instructions in the main ISA 1202) may be executed by the CPU core itself, while the extended machine instructions (e.g., instructions in the extended ISA 1204) may be offloaded into the storage device for execution.

Figure 13:
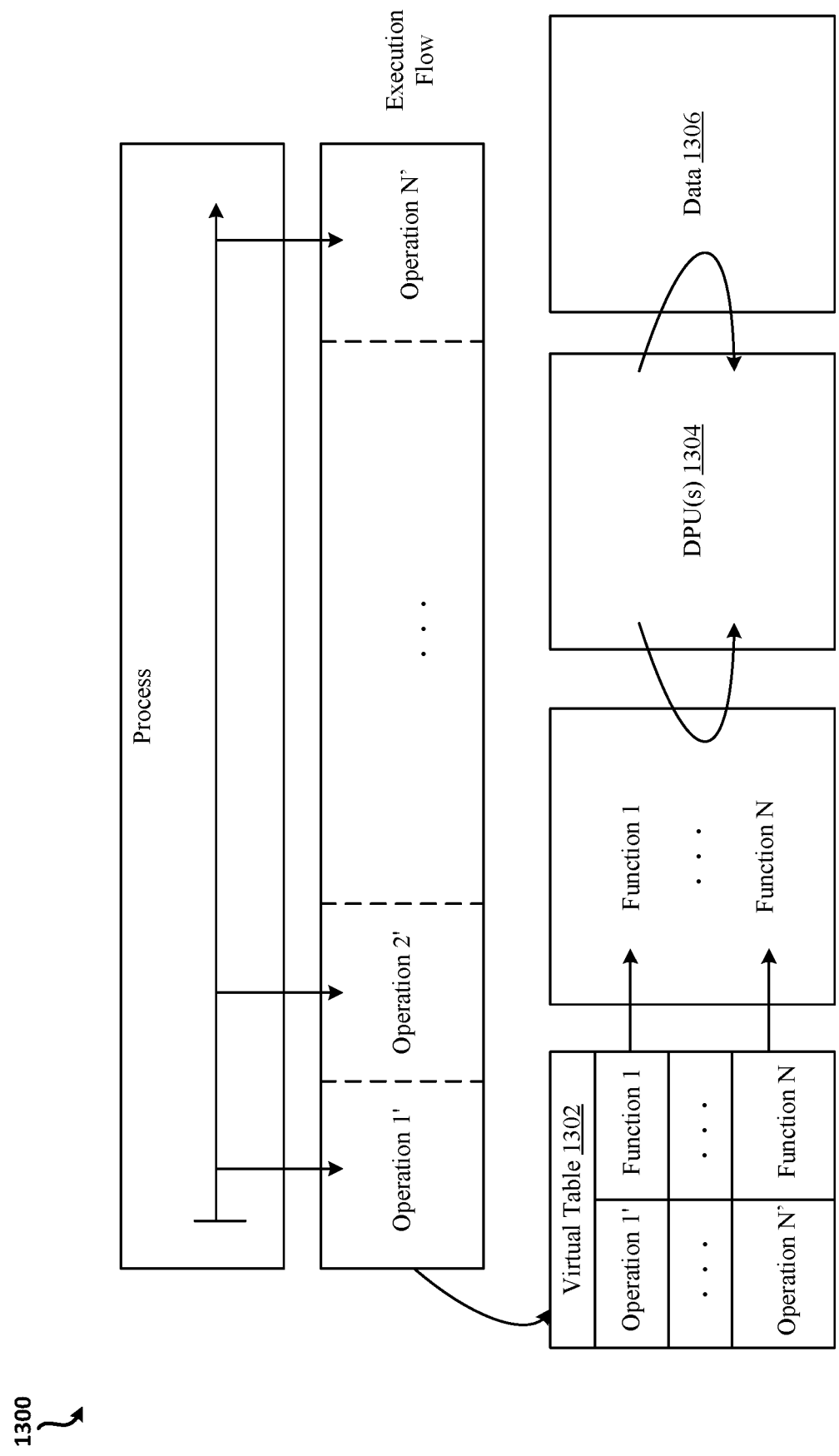
FIG. 13 shows an example virtual table in accordance with the present disclosure.

FIG. 13 shows an example framework 1300 for implementing virtual table to offload computation of extended operations to the storage device side. A storage device can implement a virtual table of methods to offload the computation of extended operation(s) on the storage device side. The storage device may comprise a special persistent memory area. The persistent memory area may be configured to store the executable code of functions. If a CPU has identified an extended operation, then the extended operation identification may be sent to the storage device side. The virtual table may need to store the extended operation ID and pointer on function image location or any other identification of function location. The storage device may store function code into the special (byte-addressable) persistent memory area. The function code may be recompiled based on extended operations. At least one portion of a function may be recompiled using extended operations for offloading execution of the at least one portion of the function into the storage device.

The extended operation identification and pointer on the function in the dedicated function area may be stored into a virtual table 1302. The virtual table 1302 may associate extended operation identifiers with function pointers. The CPU may send extended operation identifiers to the storage device. The storage device may identify function pointers in the virtual table 1302 based on the extended operation identifiers. The storage device may identify a function pointer in the virtual table 1302 based on an extended operation identifier. One or more DPUs 1304 may execute the code of requested function(s) on storage device side by applying the logic to data 1306. The storage device may comprise a field-programmable gate array ("FPGA"). The FPGA core may implement hardware logic.

Figure 14:
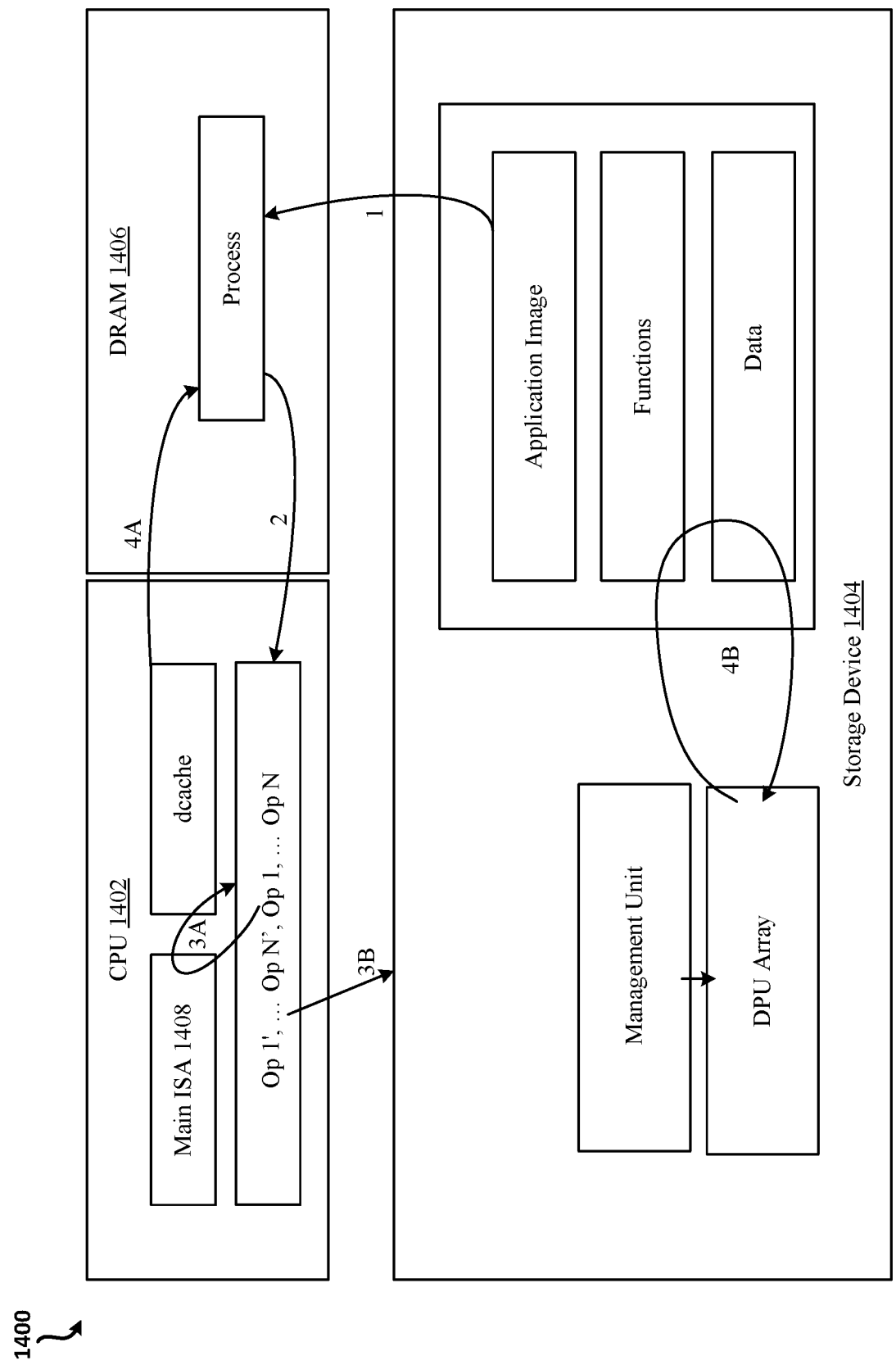
FIG. 14 shows an example framework for computational offload using an extended instructions set in accordance with the present disclosure.

FIG. 14 shows an example framework 1400 for computational offload using an extended instructions set. To execute an application, at numeral 1, an application image may be loaded. Executable code may be pre-fetched into DRAM 1406 from persistent memory of the storage device 1404. At numeral 2, the code may be pre-fetched into an instruction cache of the CPU 1402. The CPU 1402 may execute the logic of the application instruction by instruction. If the CPU 1402 has an instruction based on a main ISA 1408, then the instruction need to be executed by the CPU 1402 itself. At numeral 3A, base instructions may be executed by the CPU 1402. At numeral 4A, the result of the execution may be stored in DRAM 1406.

Extended operations/instructions based on an extended ISA 1410 are executable by the storage device and may be offloaded to the storage device for execution. Offloading the extended operations/instructions may comprise sending identifiers of extended operations/instructions to the storage device 1404 at numeral 3B. At numeral 4B, the extended operations/instructions may be executed. If a function was converted into extended operations, then the DPU on the storage device side may execute the function whose initial/original operations/instructions have been converted into the extended operations/instructions that are executable by the storage device. The base instructions from the main ISA are executed on the CPU side, while the extended instructions may be offloaded for execution on the storage device side. Thus, computation offload to the storage device 1404 may be a natural extension of the current model of CPU operations. In embodiments, the CPU 1402 may identify functions that can be offloaded and rebuild or recompile the application's code in a completely automated mode without any human activity involvement. The application execution optimization may be part of a regular execution workflow. The workload nature may define the pieces of code that need to be offloaded to the storage device side for execution.

The techniques described here may improve data processing performance by means of offloading computation to storage device side. The techniques described here may provide an automated way to optimize applications using extended instructions and application recompilation. Power consumption may be decreased by means of offloading computation to the storage device side.

FIG. 15 illustrates an example process 1500. The process 1500 may be performed for offloading computation using an extended instructions set. Although depicted as a sequence of operations in FIG. 15, those of ordinary skill in the art will appreciate that various embodiments may add, remove, reorder, or modify the depicted operations.

Initially, an application may contain only machine instructions based on a main ISA of a central processing unit (CPU). The CPU may be configured to transform executed functions (e.g., functions already executed by the CPU) into an extended instruction set (ISA) architecture. At 1502, an extended ISA may be created. The extended ISA may be created based on identifying functions executed multiple times by the CPU. An ALU of the CPU may be configured to execute a function based on instructions stored in an instructions cache. The CPU may be configured to calculate a hash for every function executed by the ALU. The extended ISA may comprise hashes. The hashes may correspond to the functions. The extended ISA may further comprise identifiers of extended operations associated with the functions. The extended operations may be converted from original operations of the functions. The extended operations may be executable by a storage device. The storage device may be associated with at least one computational core. At 1504, code may be synthesized based at least in part on the extended ISA. Certain identifiers of extended operations in the extended ISA may be sent to the storage device. The storage devices may synthesize code using extended operations identified based on the received identifiers.

At 1506, computation associated with the synthesized code may be offloaded into the storage device. The synthesized code may be added/stored into a special/dedicated memory area on the storage device side. The synthesized code may be identified by means of a corresponding identification number. Computational core(s) associated with the storage device may execute the synthesized code on the storage device side.

Figure 16:
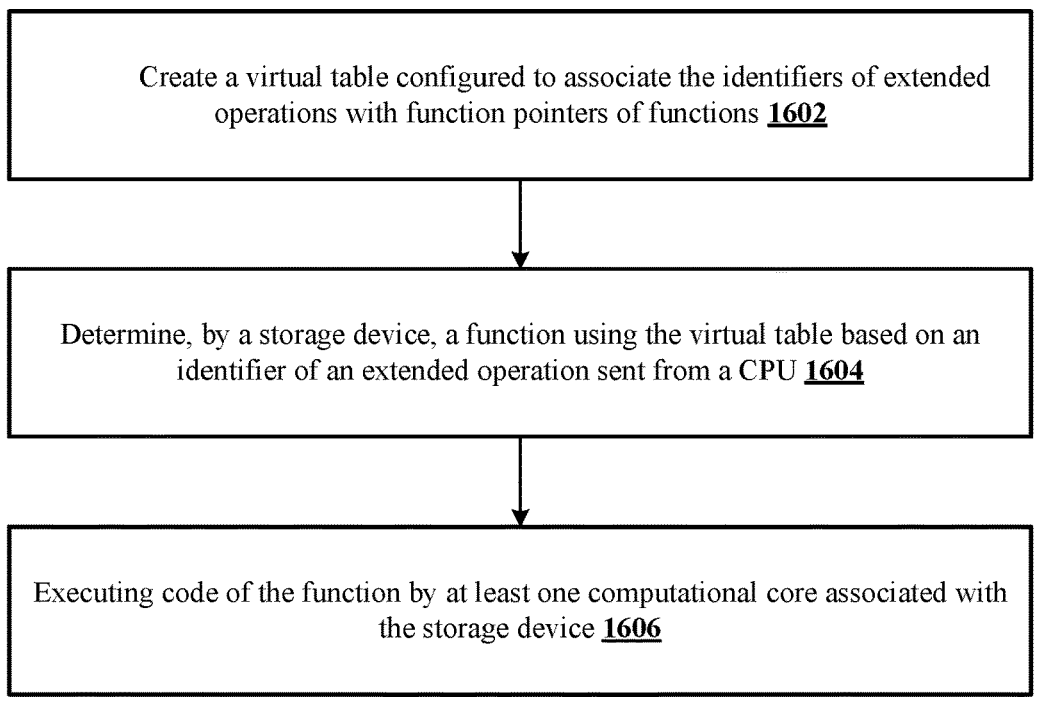
FIG. 16 shows an example process for computational offload using an extended instructions set in accordance with the present disclosure.

FIG. 16 illustrates an example process 1600. The process 1600 may be performed for offloading computation using an extended instructions set. Although depicted as a sequence of operations in FIG. 16, those of ordinary skill in the art will appreciate that various embodiments may add, remove, reorder, or modify the depicted operations.

A storage device can implement a virtual table of methods to offload the computation of extended operation(s) on the storage device side. The storage device may comprise a special persistent memory area. The persistent memory area may be configured to store the executable code of functions. If a CPU has identified an extended operation, then the extended operation identification may be sent to the storage device side. The storage device may store the function code into the special (byte-addressable) persistent memory area. The function code may be recompiled. The extended operation identification and pointer on the function in the dedicated function area may be stored into a virtual table. The function may be implemented as FPGA logic, and the pointer may identify the FPGA functional block. At 1602, a virtual table may be created. The virtual table may be configured to associate identifiers of extended operations with function pointers of functions.

The CPU may send an extended operation identifiers to the storage device. The storage device may identify the function pointer in the virtual table. At 1604, a function may be determined. The function may be determined by a storage device. The function may be determined using the virtual table. The function may be determined based on an identifier of an extended operation sent from a CPU. For example, the storage device may identify the function pointer in the virtual table using the extended operation identifier. At 1606, code of the function may be executed by at least one computational core associated with the storage device. The computational core may comprise, for example, one or more DPUs. The computational core may be configured to execute the code of requested function on the storage device side.

Figure 17:
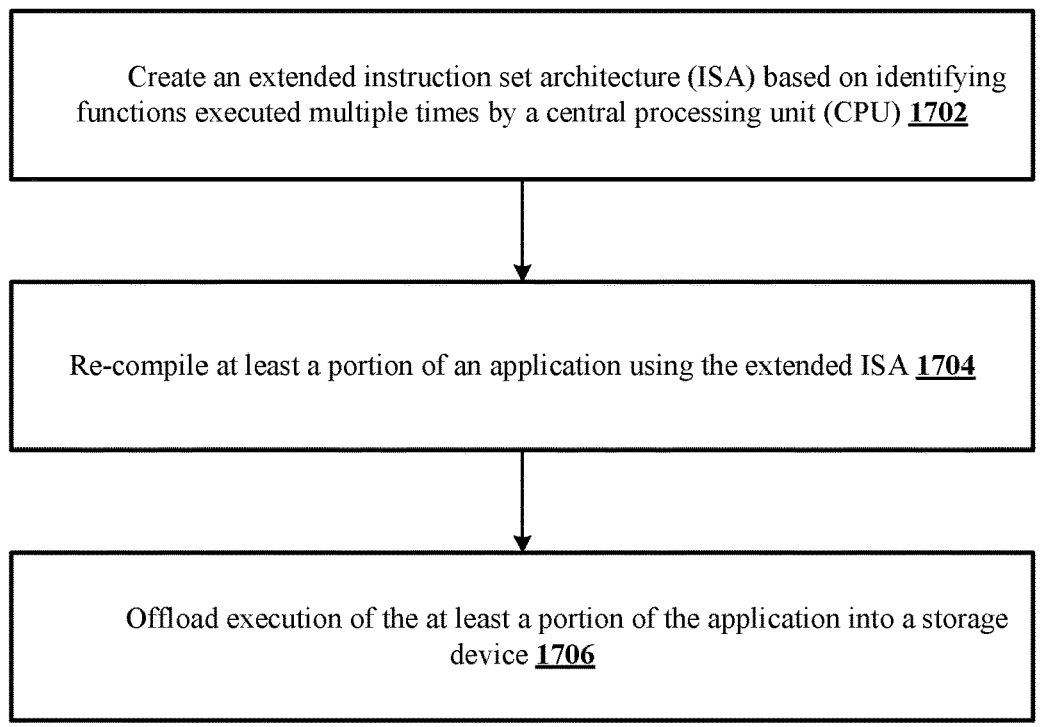
FIG. 17 shows an example process for computational offload using an extended instructions set in accordance with the present disclosure.

FIG. 17 illustrates an example process 1700. The process 1700 may be performed for offloading computation using an extended instructions set. Although depicted as a sequence of operations in FIG. 17, those of ordinary skill in the art will appreciate that various embodiments may add, remove, reorder, or modify the depicted operations.

Initially, an application may contain only machine instructions from a main ISA of a central processing unit (CPU). The CPU may be configured to create and transform executed functions (e.g., functions already executed by the CPU) into an extended instruction set (ISA) architecture. At 1702, an extended ISA may be created. The extended ISA may be created based on identifying functions executed multiple times by the CPU. At 1704, at least one portion of an application may be re-compiled. The at least one portion of the application may be re-compiled using the extended ISA. The at least one portion of the application may be re-compiled to create a modified application. The application may be re-compiled to create the modified application by exchanging a function's code in the initial application code with extended machine instruction(s) in the extended ISA. At 1706, execution of the at least one portion of the application re-compiled using the extended ISA may be offloaded into a storage device. The extended machine instruction(s) may be executed on the storage device side.

Figure 18:
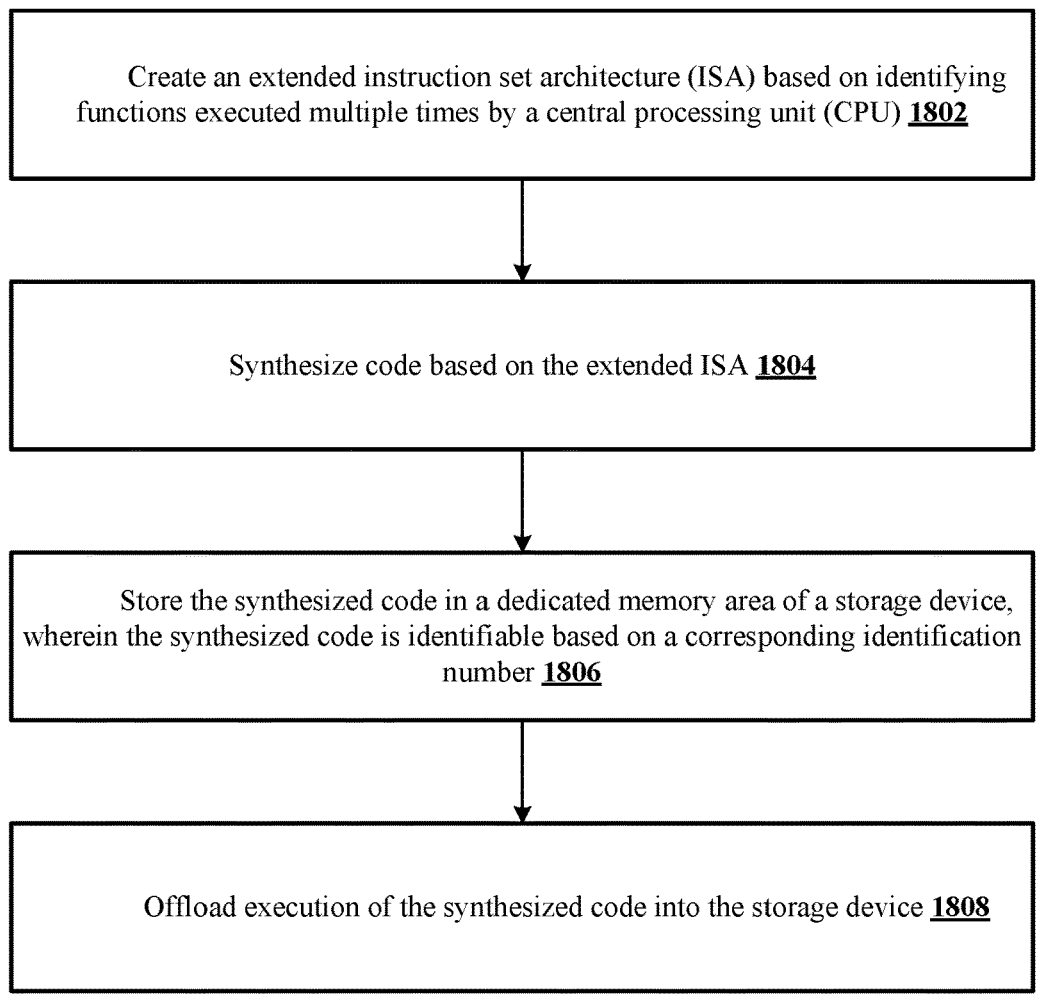
FIG. 18 shows an example process for computational offload using an extended instructions set in accordance with the present disclosure.

FIG. 18 illustrates an example process 1800. The process 1800 may be performed for offloading computation using an extended instructions set. Although depicted as a sequence of operations in FIG. 18, those of ordinary skill in the art will appreciate that various embodiments may add, remove, reorder, or modify the depicted operations.

Initially, an application may contain only machine instructions from a main ISA of a central processing unit (CPU). The CPU may be configured to transform executed functions (e.g., functions already executed by the CPU) into an extended instruction set (ISA) architecture. At 1802, an extended ISA may be created. The extended ISA may be created based on identifying functions executed multiple times by the CPU. An ALU of a CPU may be configured to execute a function based on instructions stored in an instructions cache. The CPU may be configured to calculate a hash for every function executed by the ALU. It may be determined if a hash of a function exists in an extended ISA. If the hash does not exist in the extended ISA, extended operation(s) associated with the function and the hash of the function may be added to the extended ISA. The hash and function identification may be stored temporarily in the extended ISA. If the same function is executed multiple times by the CPU, then such function may continue to stay in the extended ISA. If the same function is not executed multiple times by the CPU, the function may be removed from the extended ISA. Thus, frequently executed functions may be converted by the CPU into extended operations or instructions that are stored in the extended ISA.

The extended operation(s) may be used to synthesize code. At 1804, code may be synthesized based on the extended ISA. At 1806, the synthesized code may be stored in a dedicated memory area of a storage device. The synthesized code may be identifiable based on a corresponding identification number. The synthesized code may be executed on the storage device side. At 1808, execution of the synthesized code may be offloaded into the storage device.

Figure 19:
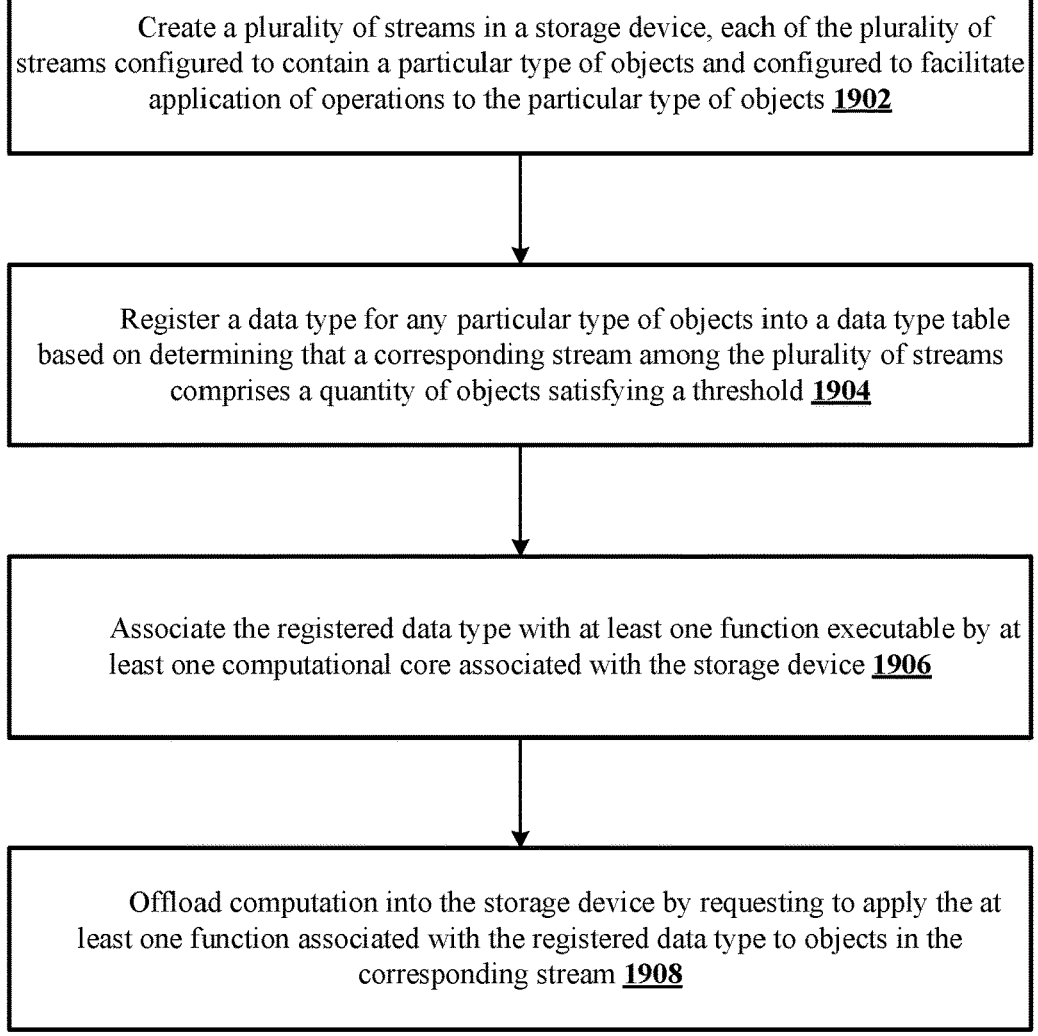
FIG. 19 shows an example process for computational offload using an extended instructions set in accordance with the present disclosure.

FIG. 19 illustrates an example process 1900. The process 1900 may be performed for offloading computation using an extended instructions set. Although depicted as a sequence of operations in FIG. 19, those of ordinary skill in the art will appreciate that various embodiments may add, remove, reorder, or modify the depicted operations.

A memory allocator may allocate pieces of memory for an application. The application may store objects into the allocated memory (e.g., into a memory bucket). The storage device may detect data types of the objects in the memory bucket. The storage device may analyze metadata or recognize the structure of each of the objects in a particular memory bucket. The storage device may compare objects in the memory bucket and create streams to store objects of a particular data type into a dedicated object stream. At 1902, a plurality of streams may be created. The plurality of streams may be created in a storage device. Each of the plurality of streams may be configured to contain a particular type of object. Each of the plurality of streams may be configured to facilitate application of operations to the particular type of object stored in that stream.

The storage device may add objects to streams based on the data types of the objects. The object streams may represent object arrays that may be used to apply operations for a particular data type. If an object stream contains only one object, then it may not yet be associated with a data type. A data type may be registered into a data type table if an object stream contains some number of objects that satisfies (e.g., exceeds) a threshold. At 1904, a data type for any particular type of objects may be registered. The data type may be registered into a data type table. The data type may be registered based on determining that a corresponding stream among the plurality of streams comprises a quantity of objects satisfying a threshold. The application may define the threshold associated with data type registration. This threshold may depend on object granularity and algorithm complexity. Thus, the threshold may be different depending on object granularity and algorithm complexity.

A registered data type may be associated with methods or functions that are configured to execute data processing on the storage device side. An application may register or store methods or functions for a particular data type in the storage device space. At 1906, the registered data type may be associated with at least one function. The at least one function may be executable by at least one computational core associated with the storage device. At 1908, computation may be offloaded into the storage device. Computation may be offloaded into the storage device by requesting to apply the at least one function associated with the registered data type to objects in the corresponding stream. The object stream may be treated as an array and the method or function may execute the computation by applying logic to every object in the array.

Figure 20:
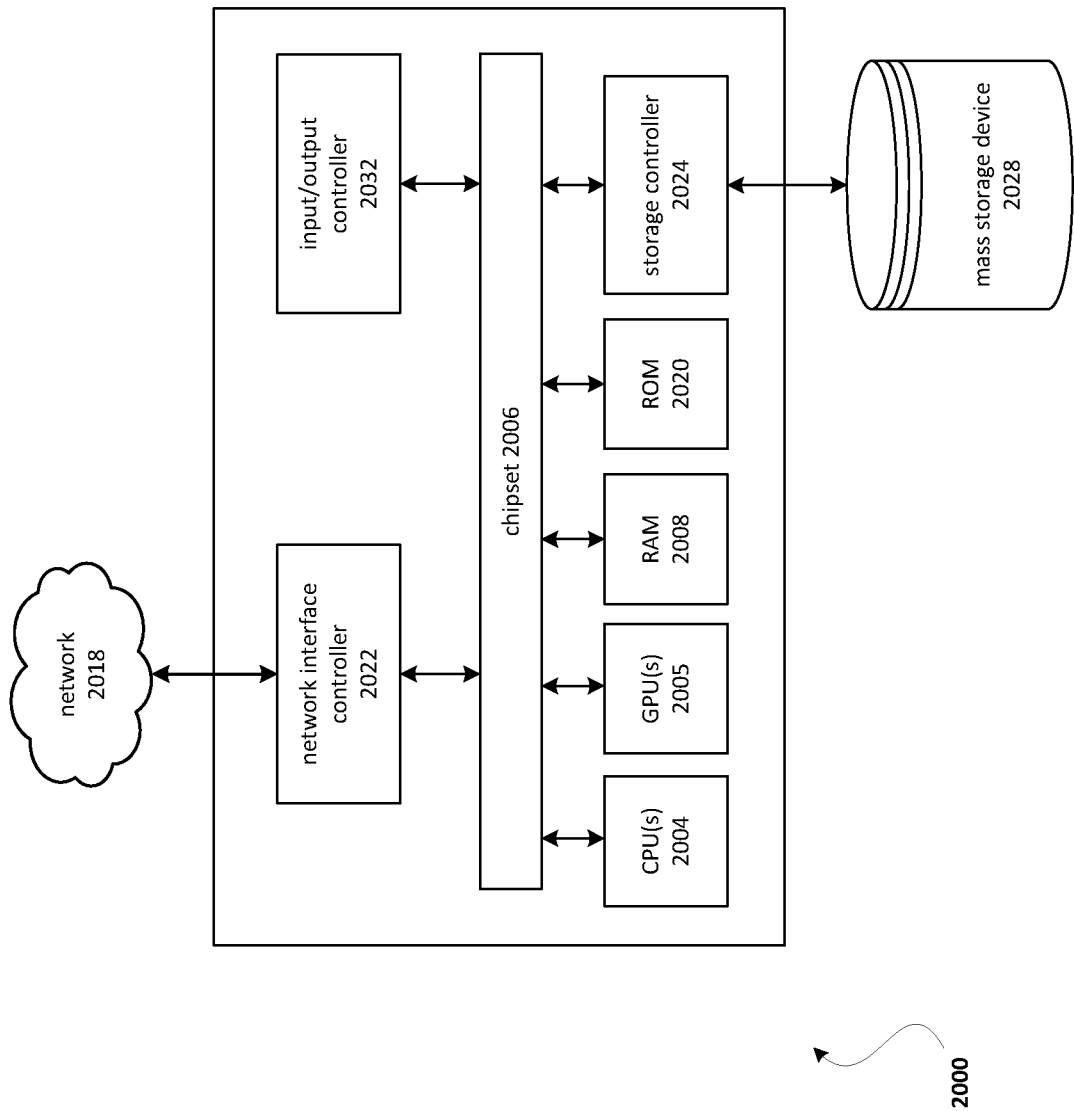
FIG. 20 shows an example computing device which may be used to perform any of the techniques disclosed herein.

FIG. 20 illustrates a computing device that may be used in various aspects, such as in any of the components depicted in FIGS. 1-14. The computer architecture shown in FIG. 20 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. The CPU(s) 2004 may be standard programmable processors that perform arithmetic and logical operations necessary for the operation of the computing device 2000.

The CPU(s) 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 2004 may be augmented with or replaced by other processing units, such as GPU(s) 2005. The GPU(s) 2005 may comprise processing units specialized for but not necessarily limited to highly parallel computations, such as graphics and other visualization-related processing.

A chipset 2006 may provide an interface between the CPU(s) 2004 and the remainder of the components and devices on the baseboard. The chipset 2006 may provide an interface to a random-access memory (RAM) 2008 used as the main memory in the computing device 2000. The chipset 2006 may further provide an interface to a computer-readable storage medium, such as a read-only memory (ROM) 2020 or non-volatile RAM (NVRAM) (not shown), for storing basic routines that may help to start up the computing device 2000 and to transfer information between the various components and devices. ROM 2020 or NVRAM may also store other software components necessary for the operation of the computing device 2000 in accordance with the aspects described herein.

The computing device 2000 may operate in a networked environment using logical connections to remote computing nodes and computer systems through local area network (LAN). The chipset 2006 may include functionality for providing network connectivity through a network interface controller (NIC) 2022, such as a gigabit Ethernet adapter. A NIC 2022 may be capable of connecting the computing device 2000 to other computing nodes over a network 2020. It should be appreciated that multiple NICs 2022 may be present in the computing device 2000, connecting the computing device to other types of networks and remote computer systems.

The computing device 2000 may be connected to a mass storage device 2028 that provides non-volatile storage for the computer. The mass storage device 2028 may store system programs, application programs, other program modules, and data, which have been described in greater detail herein. The mass storage device 2028 may be connected to the computing device 2000 through a storage controller 2024 connected to the chipset 2006. The mass storage device 2028 may consist of one or more physical storage units. The mass storage device 2028 may comprise a management component. A storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 2000 may store data on the mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 2028 is characterized as primary or secondary storage and the like.

For example, the computing device 2000 may store information to the mass storage device 2028 by issuing instructions through a storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 2000 may further read information from the mass storage device 2028 by detecting the physical states or characteristics of one or more particular locations within the physical storage units.

In addition to the mass storage device 2028 described above, the computing device 2000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 2000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 2028 depicted in FIG. 20, may store an operating system utilized to control the operation of the computing device 2000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 2028 may store other system or application programs and data utilized by the computing device 2000.

The mass storage device 2028 or other computer-readable storage media may also be encoded with computer-executable instructions, which, when loaded into the computing device 2000, transforms the computing device from a general-purpose computing system into a special-purpose computer capable of implementing the aspects described herein. These computer-executable instructions transform the computing device 2000 by specifying how the CPU(s) 2004 transition between states, as described above. The computing device 2000 may have access to computer-readable storage media storing computer-executable instructions, which, when executed by the computing device 2000, may perform the methods described herein.

A computing device, such as the computing device 2000 depicted in FIG. 20, may also include an input/output controller 2032 for receiving and processing input from a number of input devices, such as a keyboard, a mouse, a touchpad, a touch screen, an electronic stylus, or other type of input device. Similarly, an input/output controller 2032 may provide output to a display, such as a computer monitor, a flat-panel display, a digital projector, a printer, a plotter, or other type of output device. It will be appreciated that the computing device 2000 may not include all of the components shown in FIG. 20, may include other components that are not explicitly shown in FIG. 20, or may utilize an architecture completely different than that shown in FIG. 20.

As described herein, a computing device may be a physical computing device, such as the computing device 2000 of FIG. 20. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
   creating an extended instruction set architecture (ISA) based on identifying functions executed multiple times by a central processing unit (CPU), wherein the extended ISA comprises hashes corresponding to the functions and identifiers of extended operations associated with the functions, wherein the extended operations are converted from original operations of the functions, wherein the extended operations are executable by a storage device, and wherein the storage device is associated with at least one computational core;
   synthesizing code based at least in part on the extended ISA;
   offloading computation of the synthesized code into the storage device; and
   creating a plurality of streams in the storage device, each of the plurality of streams configured to contain a particular type of objects and configured to facilitate application of operations to the particular type of objects.

2. The method of claim 1, further comprising:
   creating a virtual table configured to associate the identifiers of the extended operations with function pointers of the functions.

3. The method of claim 2, further comprising:
   determining, by the storage device, a function using the virtual table based on an identifier of an extended operation sent from the CPU; and
   executing code of the function by the at least one computational core.

4. The method of claim 1, further comprising:
   re-compiling at least a portion of an application using the extended ISA; and
   offloading execution of the at least a portion of the application into the storage device.

5. The method of claim 1, further comprising:
   storing the synthesized code in a dedicated memory area of the storage device, wherein the synthesized code is identifiable based on a corresponding identification number.

6. The method of claim 1, further comprising:
   registering a data type for any particular type of objects into a data type table based on determining that a corresponding stream among the plurality of streams comprises a quantity of objects satisfying a threshold.

7. The method of claim 6, further comprising:
   associating the registered data type with at least one function executable by the at least one computational core; and offloading computation into the storage device by requesting to apply the at least one function associated with the registered data type to objects in the corresponding stream.

8. A system, comprising:
at least one processor; and
at least one memory comprising computer-readable instructions that upon execution by the at least one processor cause the system to perform operations comprising:
creating an extended instruction set architecture (ISA) based on identifying functions executed multiple times by a central processing unit (CPU), wherein the extended ISA comprises hashes corresponding to the functions and identifiers of extended operations associated with the functions, wherein the extended operations are converted from original operations of the functions, wherein the extended operations are executable by a storage device, and wherein the storage device is associated with at least one computational core;
synthesizing code based at least in part on the extended ISA;
offloading computation of the synthesized code into the storage device; and
creating a plurality of streams in the storage device, each of the plurality of streams configured to contain a particular type of objects and configured to facilitate application of operations to the particular type of objects.

9. The system of claim 8, the operations further comprising:
creating a virtual table configured to associate the identifiers of the extended operations with function pointers of the functions.

10. The system of claim 9, the operations further comprising:
determining, by the storage device, a function using the virtual table based on an identifier of an extended operation sent from the CPU; and
executing code of the function by the at least one computational core.

11. The system of claim 8, the operations further comprising:
re-compiling at least a portion of an application using the extended ISA; and
offloading execution of the at least a portion of the application into the storage device.

12. The system of claim 8, the operations further comprising:
storing the synthesized code in a dedicated memory area of the storage device, wherein the synthesized code is identifiable based on a corresponding identification number.

13. The system of claim 8, the operations further comprising:
registering a data type for any particular type of objects into a data type table based on determining that a corresponding stream among the plurality of streams comprises a quantity of objects satisfying a threshold;
associating the registered data type with at least one function executable by the at least one computational core; and
offloading computation into the storage device by requesting to apply the at least one function associated with the registered data type to objects in the corresponding stream.

14. A non-transitory computer-readable storage medium, storing computer-readable instructions that upon execution by a processor cause the processor to implement operations, the operation comprising:
creating an extended instruction set architecture (ISA) based on identifying functions executed multiple times by a central processing unit (CPU), wherein the extended ISA comprises hashes corresponding to the functions and identifiers of extended operations associated with the functions, wherein the extended operations are converted from original operations of the functions, wherein the extended operations are executable by a storage device, and wherein the storage device is associated with at least one computational core;
synthesizing code based at least in part on the extended ISA;
offloading computation of the synthesized code into the storage device; and
creating a plurality of streams in the storage device, each of the plurality of streams configured to contain a particular type of objects and configured to facilitate application of operations to the particular type of objects.

15. The non-transitory computer-readable storage medium of claim 14, the operations further comprising:
creating a virtual table configured to associate the identifiers of the extended operations with function pointers of the functions.

16. The non-transitory computer-readable storage medium of claim 15, the operations further comprising:
determining, by the storage device, a function using the virtual table based on an identifier of an extended operation sent from the CPU; and
executing code of the function by the at least one computational core.

17. The non-transitory computer-readable storage medium of claim 14, the operations further comprising:
re-compiling at least a portion of an application using the extended ISA; and
offloading execution of the at least a portion of the application into the storage device.

18. The non-transitory computer-readable storage medium of claim 14, the operations further comprising:
storing the synthesized code in a dedicated memory area of the storage device, wherein the synthesized code is identifiable based on a corresponding identification number.

19. The non-transitory computer-readable storage medium of claim 14, the operations further comprising:
registering a data type for any particular type of objects into a data type table based on determining that a corresponding stream among the plurality of streams comprises a quantity of objects satisfying a threshold;
associating the registered data type with at least one function executable by the at least one computational core; and
offloading computation into the storage device by requesting to apply the at least one function associated with the registered data type to objects in the corresponding stream.

* * * * *